US012160076B2

(12) United States Patent
Eckstein et al.

(10) Patent No.: US 12,160,076 B2
(45) Date of Patent: Dec. 3, 2024

(54) PLUG CONTACT ELEMENT, SEMI-FINISHED PRODUCT FOR PRODUCING A PLUG CONTACT ELEMENT, AND METHOD FOR PRODUCING SAID PLUG CONTACT ELEMENT

(71) Applicant: Amphenol-Tuchel Electronics GmbH, Heilbronn (DE)

(72) Inventors: Marcel Eckstein, Bretzfeld (DE); Claus Dullin, Bad Rappenau (DE); Uwe Käpplinger, Ahorn (DE); Peter Böhrer, Buchen (DE)

(73) Assignee: AMPHENOL-TUCHEL ELECTRONICS GMBH, Heilbronn (DE)

(*) Notice: Subject to any disclaimer, the term of this patent is extended or adjusted under 35 U.S.C. 154(b) by 367 days.

(21) Appl. No.: 17/611,322

(22) PCT Filed: May 14, 2020

(86) PCT No.: PCT/EP2020/063444
§ 371 (c)(1),
(2) Date: Nov. 15, 2021

(87) PCT Pub. No.: WO2020/234104
PCT Pub. Date: Nov. 26, 2020

(65) Prior Publication Data

US 2022/0209432 A1 Jun. 30, 2022

(30) Foreign Application Priority Data

May 17, 2019 (DE) ..................... 10 2019 113 152.9

(51) Int. Cl.
*H01R 4/18* (2006.01)
*H01R 13/04* (2006.01)
*H01R 43/16* (2006.01)

(52) U.S. Cl.
CPC ............. *H01R 4/185* (2013.01); *H01R 43/16* (2013.01); *H01R 13/04* (2013.01)

(58) Field of Classification Search
CPC ......... H01R 4/185; H01R 43/16; H01R 13/04
See application file for complete search history.

(56) References Cited

U.S. PATENT DOCUMENTS 6,659,814 B2 * 12/2003 Kojima .................. H01R 43/16 439/879
6,790,105 B2 * 9/2004 Fukatsu ............... H01R 13/055 439/884
2013/0295798 A1 11/2013 Cappe et al.

FOREIGN PATENT DOCUMENTS

CN 103069657 A 4/2013
EP 1 231 675 8/2002

(Continued)

OTHER PUBLICATIONS

Office Action issued in Japanese Application No. 2021-568306A dated Mar. 26, 2024, 12 pages.

*Primary Examiner* — Briggitte R. Hammond
(74) *Attorney, Agent, or Firm* — CANTOR COLBURN LLP

(57) ABSTRACT

The invention relates to a plug contact element (100) for establishing an electrically conductive connection, the plug contact element having a crimp portion for establishing an electrically conductive connection to a cable, and at least one plug contact pin (90) for establishing a releasable electrically conductive connection to a contact box (70), the plug contact element (100) being formed in one piece, and the plug contact pin (90) having a tongue (91), at least part of which is internal and which is enclosed at least partially by the contact blade outer region (92) such that at least part of the plug contact pin (90) has a sandwich fold construction comprising at least two layers of material. The invention (Continued)

Figure 1A:
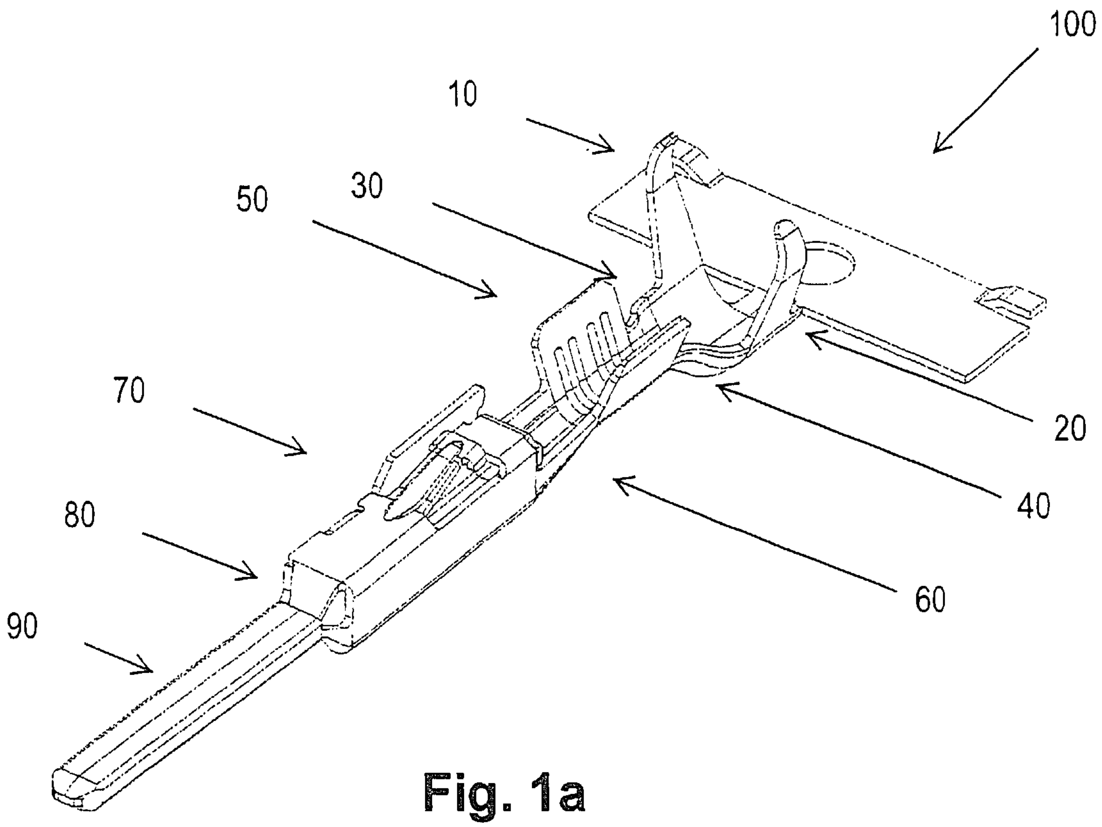

further relates to an arcuate semi-finished product (100') for producing the plug contact element (100) according to the invention, and to the method for producing the plug contact element.

20 Claims, 4 Drawing Sheets

(56) References Cited

FOREIGN PATENT DOCUMENTS

| | | | |
|---|---|---|---|
| JP | 2003036911 | A | 2/2003 |
| JP | 2012-195228 | A | 10/2012 |
| JP | 2015-103484 | A | 6/2015 |
| WO | WO 2012/023038 | A2 | 2/2012 |

* cited by examiner

PLUG CONTACT ELEMENT, SEMI-FINISHED PRODUCT FOR PRODUCING A PLUG CONTACT ELEMENT, AND METHOD FOR PRODUCING SAID PLUG CONTACT ELEMENT

RELATED APPLICATIONS

This application is a national stage application of International Application No. PCT/EP2020/063444, filed May 14, 2020, which is related to and claims priority to German Patent Application No. 10 2019 113 152.9, filed May 17, 2019, the entire disclosures of which are hereby incorporated by reference.

The invention relates to a plug-in contact element for establishing an electrically conducting connection, having a crimped section for establishing an electrically conducting connection to a line, and at least one plug-in contact mandrel for establishing a releasable electrically conducting connection to a terminal box. Furthermore, the invention relates to a sheet-shaped or plate-shaped semifinished product for producing the plug-in contact element according to the invention, and to the method for producing the plug-in contact element.

Electrical contact elements, contact arrangements, pluggable and releasable cable connecting elements and production methods which are suitable to this end are available in the known prior art. Socket or plug-in contact elements can be configured as crimped contacts. In the connecting technology for electrical contacting tasks, crimped contacts are designed as elements with tabs, the tab ends of which are bent around the electrical conductor and at the same time are pressed to it. This available connecting technology is called crimping. The reshaping and pressing operations which are required to this end are frequently stamped into a semifinished product which is prepared for this purpose, is present as an un-crimped or pre-crimped starting material and forms the subsequent contact element. In order to realize the crimped connection, the semifinished product is frequently deposited on the anvil of a crimping tool. Subsequently, the electrical conductor or a stripped section of the electrical conductor is placed on the contact element. The at least one crimping tab is then bent around the stripped section and is pressed to the latter, in order to establish a mechanically stable and electrically conductive contact between the contact element and the electrical conductor.

Depending on the area of use, requirements which are different and in part cumulative are made of crimped connections. Examples: mechanical strength, durability, low-resistance transmission of electrical energy, corrosion resistance, gas and liquid tightness.

In addition to the crimped contacts with their functional task of fastening feed lines, cables or comparable lines which are usually current-conducting to contact elements, a multiplicity of further requirements are made of contacting components. For this reason, in addition to the crimped connection regions, there are further body-like constituent parts within the contacting components which are implemented in an integrative or separate manner. Examples of this are clamping and guide elements, sockets, connector pieces, plug-in contacts, etc.

Known methods for producing contacting components are, in particular, stamping and reshaping processes. First of all, a flat is separated from a metal sheet or sheet material by way of a stamping step or else more generally by way of a separation step. Here, the flat is provided in a suitable way with contours which assist shaping to form the contacting element and its defined functions. The flat semifinished product which is provided in this way is subsequently further formed in one or more reshaping steps. Possible reshaping operations can be realized by way of folding, angling over, pressing, deep-drawing or the like.

Other production possibilities for contacting elements can take place by way of sintering operations, additive manufacturing methods or by way of chipping or chip-removing machining.

Although the combination of the methods of stamping and reshaping of a flat starting material is an economical and reliable way of providing contacting components in large numbers, the restricted geometrical shaping thereof limits the integration of various functions into single-part contacting components and, in particular, socket contact elements.

In order to mitigate this disadvantage, the integrally implemented functions are limited or reduced, in order to decrease the complexity of the component and/or to configure the contact components in multiple pieces. Additive manufacturing methods such as, for example, 3D printing or stereolithography also come into question, but these are suitable only to a limited extent for mass production, are economically disadvantageous and are limited with regard to materials which can be processed.

The subject matter of DE 10 2017 126 185 A1 is an invention, the basic concept of which comprises a contact element with a resilient clamping element, the clamping element having a fastening arm which engages around the contact element, and a clamping spring arm for contacting a stranded conductor. In this way, a contact element with a plug-in contact section is implemented, which contact element is of two-part construction for the combined functional requirements of the stranded conductor contacting and the releasable plug-in contacting.

Known plug-in contact elements have disadvantages which can comprise, inter alia, economical production, plug-in and/or contacting safety, mechanical strength, structural integrity, durability, shock and/or vibration resistance, corrosion resistance, current conducting properties, and do not fulfill them or do not fulfill them completely.

It is an object of the invention to at least partially reduce the abovementioned disadvantages and to provide a single-part plug-in contact element.

In order to achieve this, the invention proposes a plug-in contact element of single-part construction for establishing an electrically conducting connection, which plug-in contact element is equipped with a crimped section for establishing an electrically conducting connection to a line, and with a plug-in contact, a contact blade, and a plug-in contact mandrel for establishing a releasable electrically conducting connection to a terminal box. Furthermore, the invention proposes a sheet-shaped semifinished product for producing a plug-in contact element, and the production method by way of reshaping.

The invention recognizes that the geometrical complexity of the flat material as a semifinished product for single-part plug-in contact elements and/or the reshaping sequence is suitable to at least partially reduce the disadvantages which are present in the prior art and, moreover, to provide further advantages.

The invention proposes, starting from a sheet-shaped flat material with an edge geometry which is adapted to the plug-in contact element, to preferably generate a contact design by way of reshaping, which contact design satisfies a sandwich fold in the plug-in zone, that is to say in the region of the plug-in contact, the contact blade, and the plug-in contact mandrel, with the consequence that the plug-in contact cross section has a triple material thickness after the folding.

According to the invention, the cavity which is formed on the inner side by way of the contact blade geometry is filled or occupied by a tongue, with the result that the outer material of the plug-in contact mandrel experiences support on the inner side. The triple material thickness and/or the supporting effect increase/increases the strength significantly.

Both to the inner tongue element and the outer contact blade region and crimped section or section for fixing the line are single-part constituent parts of the plug-in contact element. As a result, a construction situation is achieved which produces a double attachment of the plug-in contact mandrel to the terminal box. The first attachment is implemented by way of the contact blade outer region, and the second attachment is implemented by way of the tongue element. This double attachment results in a high stability of the construction and likewise of the contact blade.

The invention preferably provides that a symmetrical fold and a symmetrical cross section are produced in the contact blade region. This means that the tongue is enveloped by the contact blade outer region in an axially symmetrical or point-symmetrical manner. Here, the joint of the outer material preferably lies in the plane of symmetry. Designs which differ from the symmetrical geometry situation are likewise aided by the invention.

In addition to the at least partial reduction of the disadvantages which are present in the prior art, the teaching according to the invention affords a plurality of advantages:

The construction assists the single-part design of the plug-in contact element, with the result that this can be produced by way of a plate, sheet-shaped flat material with an outer edge geometry according to the invention. This results, furthermore, in the advantage of efficient manufacture which is suitable for mass production.

The plug-in contact element is realized in a sandwich fold, with the result that both the strength of the plug-in element and also of the overall component is increased by way of the triple or two-layer and/or three-layer build-up of material. The double attachment situation of the contact blade to the plug-in contact element increases the strength and structural integrity significantly.

The outer material of the plug-in contact mandrel is folded around the inner tongue element, with the result that very small corner radii can be configured in the rounded-off regions. In this way, the invention aids an increased area with a planar configuration of the plug-in contact mandrel which is preferably rectangular in cross section, which area is available as a contact area. The result is an increased contact area, with the result that the contacting quality for the electrically conducting connection is increased.

A further advantage of the geometrical design according to the invention lies in its scalability and/or the highly precise reproducibility within narrow tolerance ranges relating to the dimensions, shape and position. As a result, very high quality requirements can be ensured and tight safety standards can be complied with.

Figure 1B:
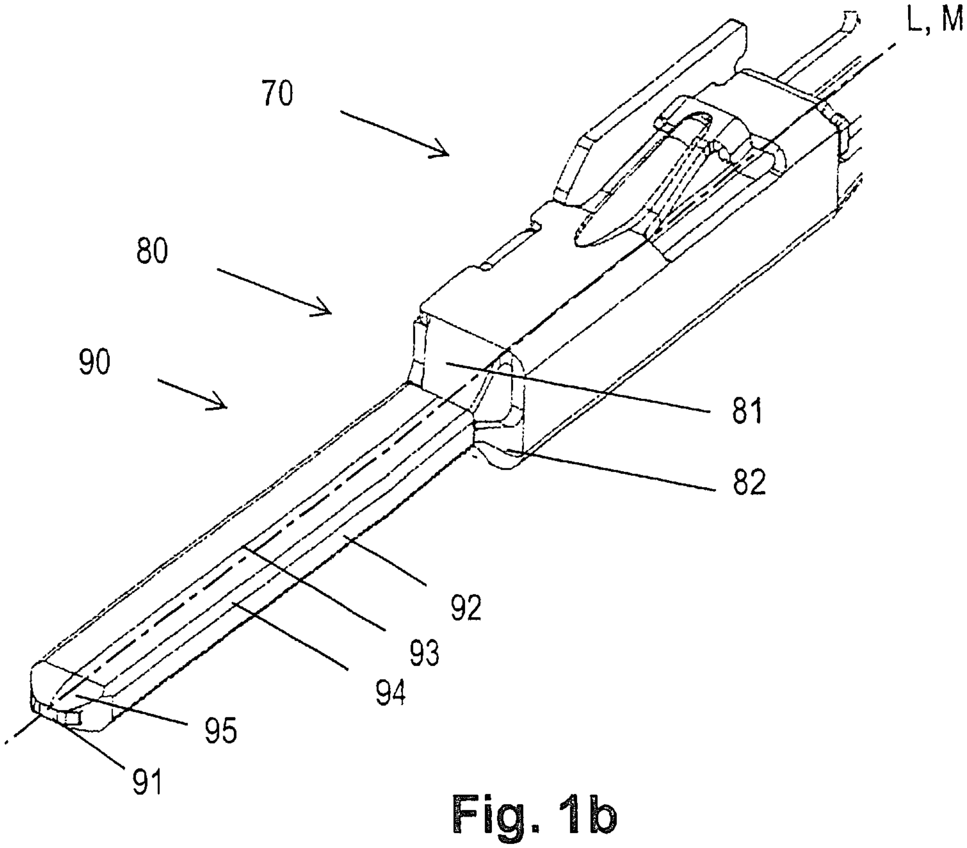
Figure 2A:
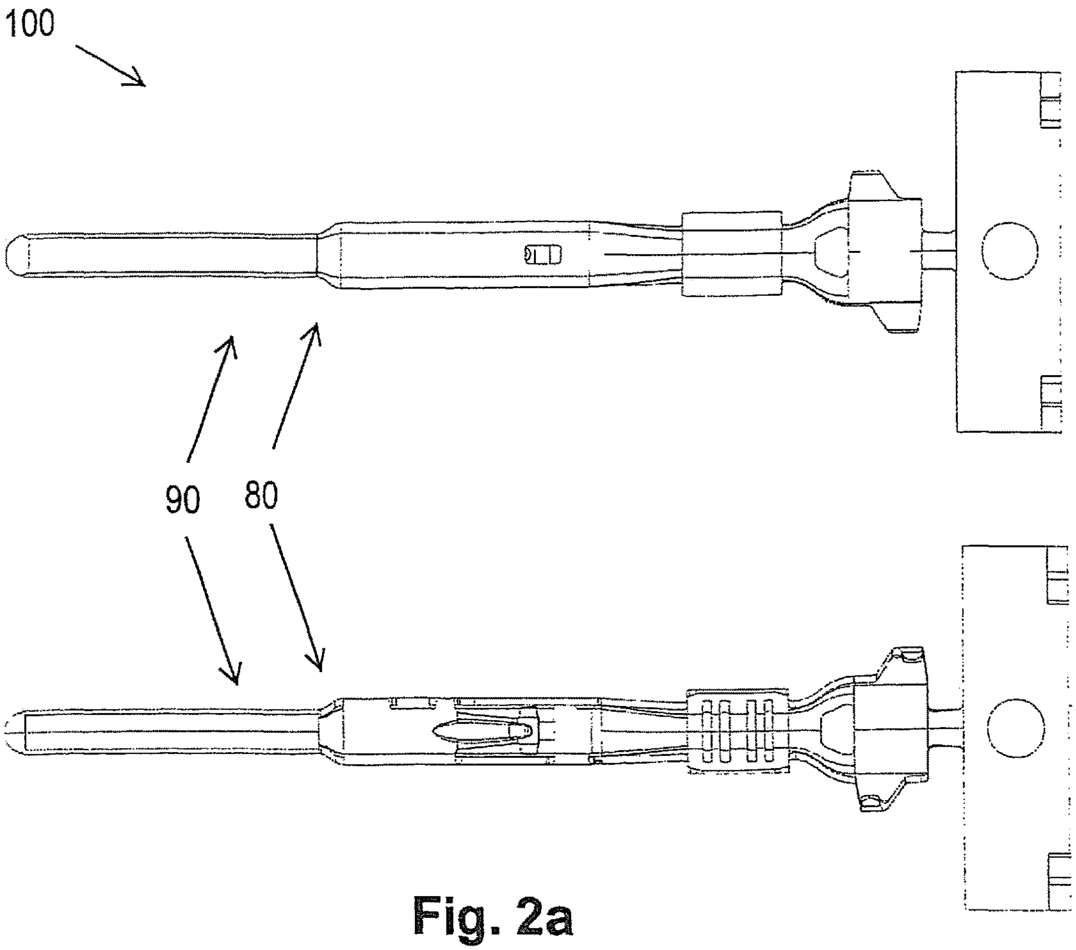
Figure 2B:
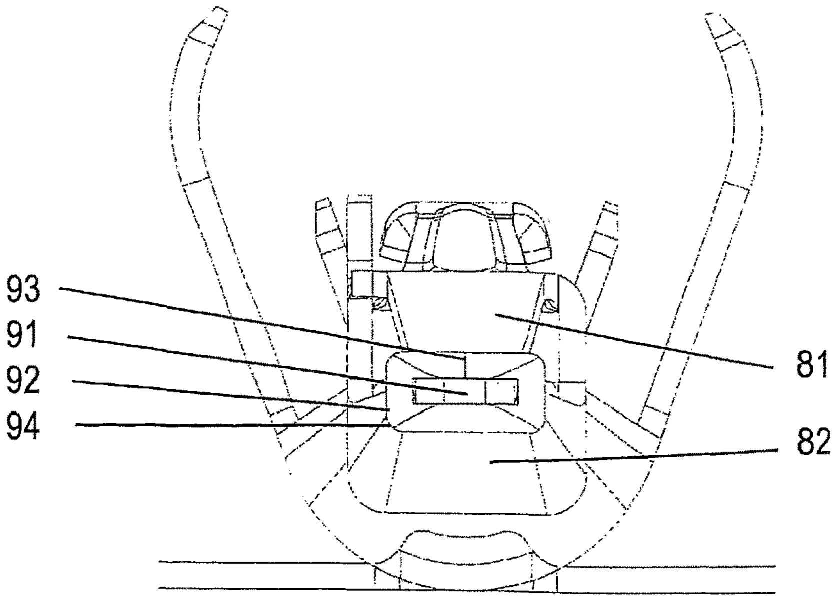
Figure 3A:
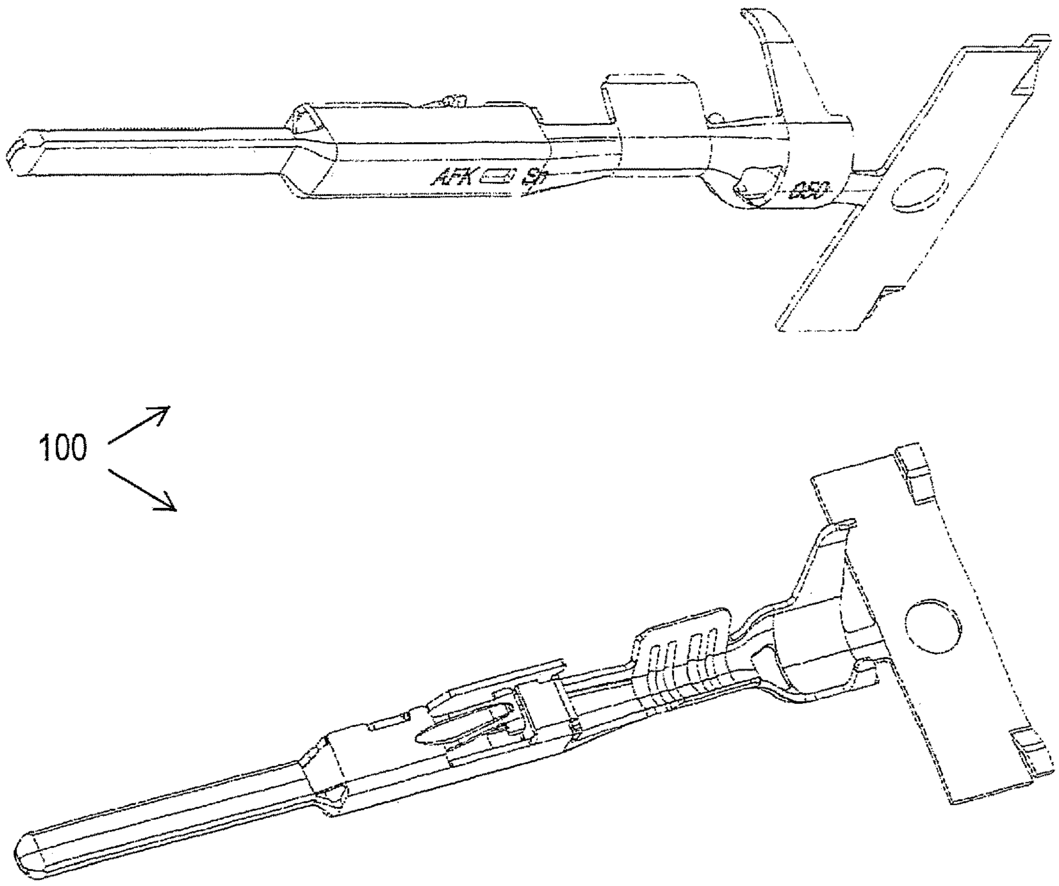
Figure 3B:
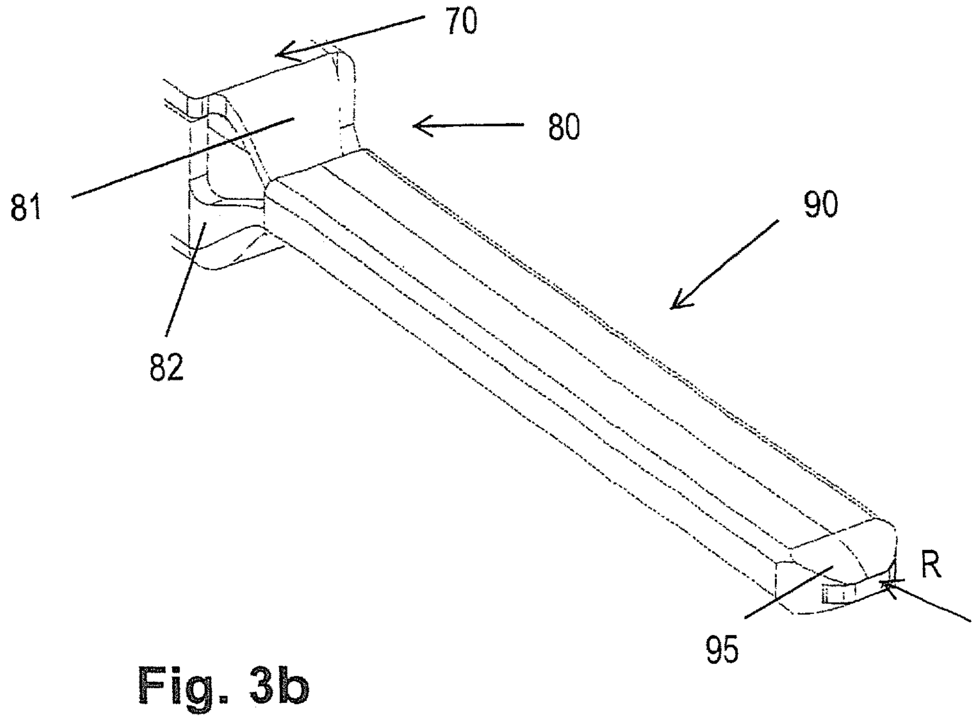
Figure 4:
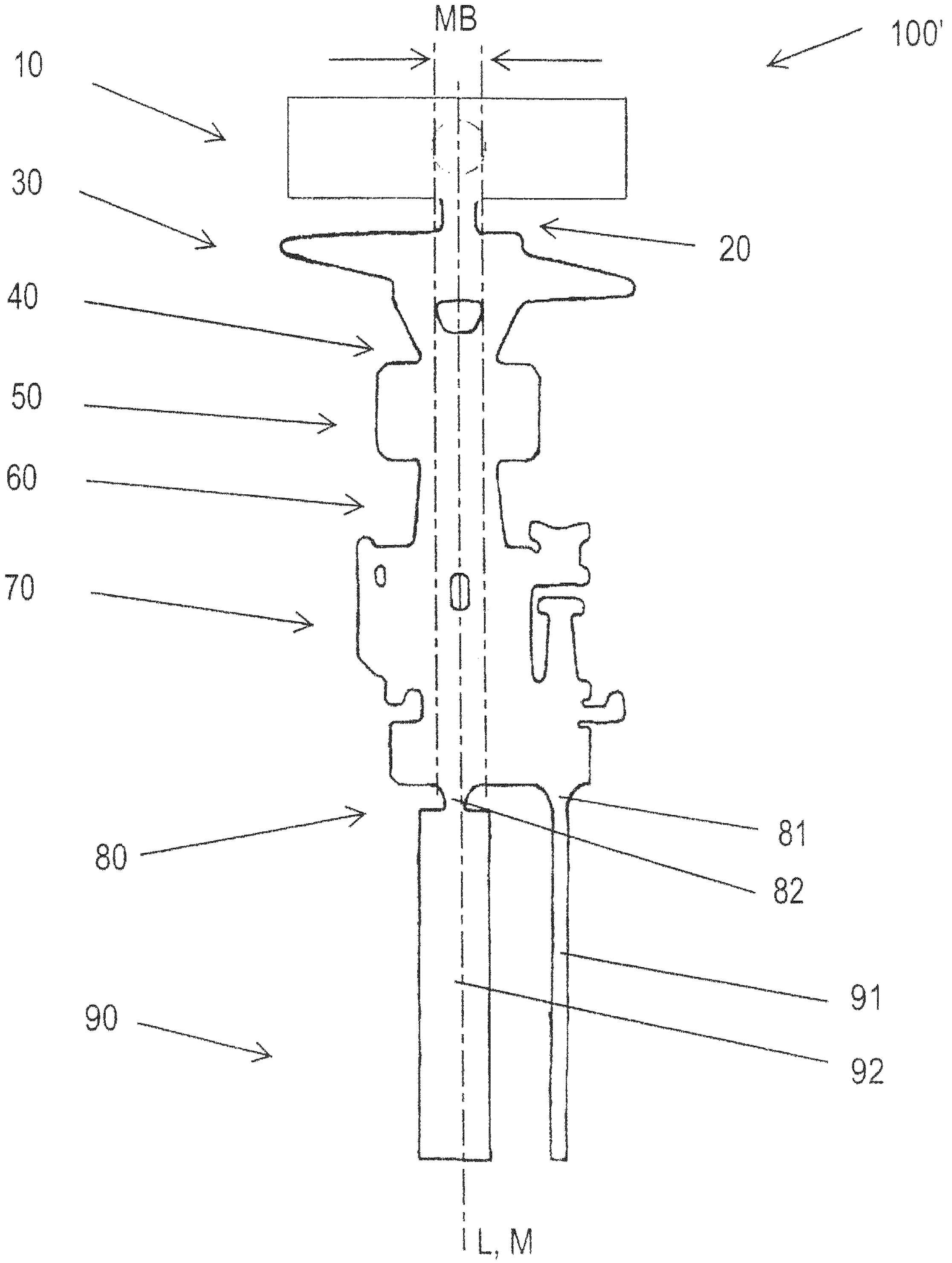

The invention will be described in greater detail in the following text on the basis of one preferred exemplary embodiment in conjunction with the figures, in which:

FIG. 1*a*, 1*b* show a perspective view of one exemplary embodiment of the plug-in contact element and the plug-in contact region which is shown on an enlarged scale, FIG. 2*a*, 2*b* show the top view and the view from below of the exemplary embodiment of the plug-in contact element, and its end-side view, FIG. 3*a*, 3*b* show further perspective views of the exemplary embodiment of the plug-in contact element and the plug-in contact region which is shown on an enlarged scale, and FIG. 4 shows the top view of one possible embodiment of the sheet-shaped, single-piece flat material as a semifinished product for a plug-in contact element after a contour-forming production step, for example a stamping process, and before reshaping by way of angling over and folding.

FIG. 1*a* comprises the perspective view of one exemplary embodiment of the plug-in contact element 100 with its various sections 10 to 60, and the contact blade 90 which is fixed on the terminal box 70 via the connecting section 80. Primary elements of the plug-in contact mandrel 90 are the inner-side tongue 91 and the contact blade outer region 92.

FIG. 1*b* shows the plug-in contact region 90 which is shown on an enlarged scale with the terminal box 70 which are coupled to one another by way of the connecting section 80. Both the contact blade 90 with its primary components of tongue 91 and outer region 92 and their connecting section 80, formed by way of its respective connecting tabs 81, 82, are constructed in one part in a manner which is based on a semifinished product flat 100'.

The tongue 91 which is arranged on the inner side and, in this exemplary embodiment, centrally or centrically, is enclosed or engaged around by the contact blade outer region 92. The tongue 91 has a square or rectangular cross section. Other cross sections are conceivable, for example elliptical, round, oval or triangular. Other cross sections than square cross sections can be produced in a manner which is based on the semifinished product flat 100' by way of massive forming (hot or cold), kneading or machining. In the longitudinal direction L of the tongue 91, the latter is enveloped by the contact blade outer region 92, at least one seam or joint 93 being formed by way of the preferably realized folding process. This joint 93 can be configured with or without an air gap.

The contact blade outer region 92 can have a radius or chamfer 94 on at least one longitudinal edge and/or can be deformed by way of an angling-over operation. A chamfer or tip 95 is optionally possible on the end side, in order to assist threading into the counterpiece of the plug-in contact 90. The tip 95 can be configured so as to be flush on the end side with the enveloped tongue 91 or so as to be set back from and project beyond the tongue 91.

FIG. 2*a* shows the top view and the view from below of the exemplary embodiment of the plug-in contact element 100 with a connecting section 80 to the plug-in contact mandrel 90.

The end-side view of the plug-in contact element 100 is shown in FIG. 2*b*. The tongue connecting tab 81 of this exemplary embodiment is of tapered configuration, that is to say it has a tab width which decreases in the longitudinal extent L in the direction of the contact blade 90. The tab can also possibly be provided with a constant width in the longitudinal direction L. The attachment regions of the tongue connecting tabs 81 on the terminal box 70 and/or on the tongue element 91 can be shaped in a gentle curve, for example formed by way of radii, with the result that the notch effect is reduced locally.

The connecting tab 82 of the contact blade outer region can likewise be tapered and spatially curved, as shown, by virtue of the fact that it is formed both in parallel out of the plane relative to the attachment on the terminal box 70 and out of this plane. The invention preferably provides that the connecting tab 82 of the contact blade outer region is designed on the terminal box 70 so as to run around partially on its outer contour and/or so as to run around partially in the connecting region to the contact blade outer region 92. In this way, the construction according to the invention achieves a special design strength and flexural strength in this connecting region, which is increased further by way of the interaction of the tongue connecting tab 81.

FIG. 3*a* illustrates the exemplary embodiment of the plug-in contact element 100 in two perspective views with spatial orientations which differ from one another. In this example, the magnitude of the longitudinal extent of the plug-in contact mandrel 90 is approximately identical to that of the longitudinal extent of the terminal box 70. Other length configurations are possible depending on the required plug-in-depth of the contact blade 90 into the plug-in contact partner or plug-in contact socket, and are aided by the invention.

The plug-in contact region 90, which is shown three-dimensionally and on an increased scale in comparison with FIG. 3*a*, with a connecting section 80 is the subject matter of FIG. 3*b*. The partially circumferential connecting tab contact blade outer region 82 on the terminal box 70 and contact blade outer region 92 is shown in its three-dimensional extent. The contact mandrel tip 95 can be configured at least partially as a rounded portion R.

FIG. 4 shows the top view of one possible embodiment of the sheet-shaped, single-piece flat material 100' as a semi-finished product for a plug-in contact element 100 after a contour-forming production step, for example a stamping process, and before the reshaping by way of angling over or folding.

The subsequent contact blade 90 is coupled in one piece by way of its elements of tongue 91 and contact blade outer region 92 via the connecting region 80 or the tabs 81, 82 to the terminal box material 70.

The geometrical configuration of this example provides that the contact blade outer region 92 is constructed with an offset with respect to the longitudinal axis L. This offset and the spacing which is realized in the transverse direction with respect to the longitudinal axis L from the tongue 91 determine, together with the edge length to be formed of the terminal box 70, the type of enclosure of the contact blade outer region 92 enveloping the tongue 91. The variant which is shown assists the symmetrical folding with a joint 93 according to FIGS. 1 to 3.

In the case of an eccentric joint 93, a U-shaped enclosure or other geometrical folding situations, the shape and position changes with regard to the connecting region 80, the stop positions of the tabs 81, 82, the width ratios of the contact blade elements 91, 92 and the relation of the terminal box edge length are required.

The deformation processes for the configuration of the plug-in contact element 100 can be broken down roughly into four zones of the semifinished product flat 100':

the central region MB in between, and the two adjoining outer regions, and the middle centering of the tongue 91, and enclosure of the tongue by way of the contact blade outer region.

The central region MB is not deformed or deformed to a merely marginal extent in the handling region 10 and in the region of the terminal box 70, with the result that a substantially flat structure is maintained. In the other regions, a spherical or spatial deformation with a different design, for example in the manner of a cylindrical section, takes place.

The respective outer regions can be the subject of angling-over measures, folding processes or free deformations. Angling-over and folding sequences can be provided, in particular, in the region of the terminal box 70.

After the deformation processes of the zones and regions 10 to 70 of the semifinished product 100' have at least been substantially carried out, the plug-in contact region 80, 90 is shaped:

a. middle centering of the tongue 91 by virtue of the fact that the tongue 91 is at least moved closer to the center axis M parallel to the longitudinal axis L with the deformation of the tongue element connecting tab 81;

b. producing of the engagement around the tongue 91 by way of the contact blade outer region 92.

Step b. can be supplemented by a centering action, which is required depending on the middle centering of the tongue 91 which is moved closer thereto, of the contact blade outer region 92 by way of deformation of its connecting tab 82.

LIST OF DESIGNATIONS

10 Handling section
20 First connecting section
30 Insulation section
40 Second connecting section
50 Crimped section
60 Third connecting section
70 Terminal box, terminal box material
80 Connecting section, plug-in contact element
81 Connecting tab tongue, tongue element
82 Connecting tab, contact blade outer region
90 Plug-in contact, contact blade, plug-in contact mandrel, plug-in contact region
91 Tongue, tongue element
92 Contact blade outer region
93 Seam, joint, plug-in contact mandrel joint
94 Radius, chamfer, angled-over edge region
95 Chamfer, tip, contact mandrel tip
100 Plug-in contact element
100' Semifinished product flat
L Longitudinal axis
M Center axis
R Rounded portion, rounded-off portion
MB Central region

The invention claimed is:

1. A plug-in contact element for establishing an electrically conducting connection, having a crimped section for establishing an electrically conducting connection to a line;

a terminal box; and at least one plug-in contact mandrel for establishing a releasable electrically conducting connection to the terminal box, wherein the plug-in contact element is of single-part construction, and wherein the plug-in contact mandrel has a tongue disposed at least partially within a contact blade outer region such that a sandwich fold of the plug-in contact mandrel with an at least two-layer build-up of material is formed at least in sections, wherein the contact blade outer region encloses an entire perimeter of the tongue.

2. The plug-in contact element for establishing an electrically conducting connection as claimed in claim 1, wherein the build-up of material has three layers.

3. The plug-in contact element for establishing an electrically conducting connection as claimed in claim 1, wherein the plug-in contact mandrel and/or the tongue have/has a substantially square-shaped cross section.

4. The plug-in contact element for establishing an electrically conducting connection as claimed in claim 1, wherein the contact blade outer region has a joint which is configured centrally or eccentrically and with or without a joint gap.

5. The plug-in contact element for establishing an electrically conducting connection as claimed in claim 1, wherein a connecting section with at least one connecting tab for the tongue and at least one connecting tab for the contact blade outer region is provided.

6. The plug-in contact element for establishing an electrically conducting connection as claimed in claim 5, wherein at least one connecting tab is tapered.

7. The plug-in contact element for establishing an electrically conducting connection as claimed in claim 5, wherein the at least one connecting tab for the contact blade outer region is curved spatially.

8. The plug-in contact element for establishing an electrically conducting connection as claimed in claim 1, wherein the contact blade outer region has a radius or chamfer on at least one longitudinal edge and/or is deformed by way of an angling- over operation.

9. The plug-in contact element for establishing an electrically conducting connection as claimed in claim 1, wherein the contact blade is formed on an end side of the plug-in side as a tip or has a rounded portion.

10. The plug-in contact element for establishing an electrically conducting connection as claimed in claim 9, wherein the tip is configured so as to be flush on the end side with the enveloped tongue or so as to be set back from or project beyond the tongue.

11. A sheet-shaped semifinished product for producing the plug-in contact element as claimed in claim 1, wherein the semifinished product is electrically conducting and can be deformed, with the result that the plug-in contact element of single-part construction with the plug-in contact mandrel can be produced by way of angling over, folding, spatial reshaping, or combination thereof.

12. The sheet-shaped semifinished product for producing the plug-in contact element as claimed in claim 11, wherein an edge and contour of the semifinished product assists a geometric design of the plug-in contact element with the plug-in contact mandrel after the reshaping.

13. The sheet-shaped semifinished product for producing the plug-in contact element as claimed in claim 12, wherein the edge and contour of the semifinished product has at least one tongue and at least one contact blade outer region which are coupled by way of a connecting section to a terminal box.

14. A method for producing the plug-in contact element as claimed in claim 1, from a semifinished product as claimed in claim 11 by way of spatial reshaping, folding, angling over, or a combination thereof, wherein after deformations of zones and regions, the contact blade is formed by way of producing an engagement around the tongue by the contact blade outer region.

15. The method for producing the plug-in contact element as claimed in claim 14, wherein before the engagement is produced, middle centering of the tongue takes place via the tongue being at least moved closer to the center axis parallel to a longitudinal axis with deformation of a tongue element connecting tab.

16. The plug-in contact element for establishing an electrically conducting connection as claimed in claim 1,
wherein the tongue has a first longitudinal end that is a free end and a second longitudinal end opposite the first longitudinal end that is attached to the terminal box.

17. The plug-in contact element for establishing an electrically conducting connection as claimed in claim 16,
wherein the tongue extends in a longitudinal direction from the terminal box.

18. The plug-in contact element for establishing an electrically conducting connection as claimed in claim 16, w
herein the tongue and the contact blade outer region extend separately from different portions of the terminal box.

19. The plug-in contact element for establishing an electrically conducting connection as claimed in claim 18,
wherein the tongue and the contact blade outer region extend separately from different portions of the terminal box in a longitudinal direction.

20. The plug-in contact element for establishing an electrically conducting connection as claimed in claim 16,
wherein the tongue and the contact blade outer region are separate for an entire longitudinal extent of the plug-in contact mandrel.

* * * * *